(12) United States Patent
Kucik

(10) Patent No.: US 6,657,585 B1
(45) Date of Patent: Dec. 2, 2003

(54) SYSTEM FOR GENERATING GPS POSITION OF UNDERWATER VEHICLE

(75) Inventor: Daniel P. Kucik, Lynn Haven, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/153,494

(22) Filed: May 21, 2002

(51) Int. Cl.[7] ................................................ G01S 5/14
(52) U.S. Cl. ................................................ 342/357.06
(58) Field of Search ........................ 342/357.17, 357.02, 342/357.03, 357.06; 701/213; 441/33, 11

(56) References Cited

U.S. PATENT DOCUMENTS 5,202,829 A * 4/1993 Geier ........................ 701/215
6,261,142 B1 * 7/2001 Fiotakis ..................... 441/11
6,501,704 B2 * 12/2002 Nishimura ................. 367/130

FOREIGN PATENT DOCUMENTS

WO    WO 01/55747 A1 * 8/2001 ............ G01V/1/38

* cited by examiner

Primary Examiner—Gregory C. Issing
(74) Attorney, Agent, or Firm—Harvey A. Gilbert; Donald G. Peck

(57) ABSTRACT

A system for generating an approximate GPS position of a vehicle traveling under the surface of the water includes a tether coupled to the vehicle, floatable structures coupled to the tether at spaced-apart positions therealong, a position determination system, and at least one GPS antenna provided at each floatable structure and coupled to the position determination system. The position determination system uses the GPS signals received at the GPS antenna that is nearest the vehicle to generate a global position fix that approximates a GPS position of the vehicle.

19 Claims, 3 Drawing Sheets

SYSTEM FOR GENERATING GPS POSITION OF UNDERWATER VEHICLE

ORIGIN OF THE INVENTION

The invention described herein was made in the performance of official duties by an employee of the Department of the Navy and may be manufactured, used, licensed by or for the Government for any governmental purpose without payment of any royalties thereon.

1. Field of the Invention

The invention relates generally to GPS positioning systems, and more particularly to a system that minimizes the error associated with generating a GPS position of vehicle traveling under the surface of the water.

2. Background of the Invention

Few systems exist for tracking or obtaining position information for vehicles that operate under water. Furthermore, existing technologies either cannot operate automatically or have large errors imbedded in their position fixes. For example, laser-based optical trackers are complex systems that require substantial amounts of set-up time and maintenance thereby making them impractical for use with autonomous underwater vehicles. An approach for automatically obtaining position information of an underwater vehicles uses a Global Positioning System (GPS) receiver mounted on a float which is towed behind the vehicle with a fixed-length tether. However, errors associated with this method are substantial as is explained below.

Since the deactivation of Selective Availability (SA) on May 1, 2000, GPS receivers are capable of obtaining position fixes with a circular error of approximately 10 meters. This error can be further reduced through the use of differentially corrected GPS (DGPS). Differential corrections are generated at a fixed site and transmitted, typically using the Radio Technical Commission for Maritime Services (RTCM) SC 104 standard, to rover DGPS receivers. The rover DGPS receivers then combine the data received from the GPS satellites and the RTCM data to generate the DGPS position fix, which can have less than 1-foot of error when the corrections are generated at a nearby site.

The current approach utilizing DGPS to obtain a position fix on a vehicle operating underwater will now be explained with the aid of FIG. 1 where a vehicle 10 has a fixed-length tether 12 coupled thereto. Tether 12 has a float 14 coupled to its outboard end. Mounted onboard float 14 is a DGPS receiver 16 and a GPS antenna 18 for receiving GPS signals. Vehicle 10 is operating at a depth D and the length of tether 12 being towed is L. Placing GPS antenna 18 and receiver 16 on float 14 can provide fixes that contain less than a foot of circular error relative to the position of float 14 when locally generated differential corrections are used. However, with respect to the position of vehicle 10, there is significant error resulting from the "watch circle", the radius of which is defined as the horizontal distance W between vehicle 10 and float 14. Watch circle error is the result of a fixed length tether being used to tow a float in water depths less than the length of the tether. The error caused by this effect can be very significant. For example, if tether length L is 15-feet and vehicle 10 is operating at a depth of 10 feet, the resulting watch circle error W can be as much as 11.18 feet.

SUMMARY OF THE INVENTION

Accordingly, it is an object of the present invention to provide a system for generating a position fix for a vehicle operating under the surface of the water.

Another object of the present invention is to provide a system that reduces watch circle errors when generating a GPS position fix for a vehicle operating under the surface of the water.

Still another object of the present invention is to provide a system for automatically generating and updating a position fix for a vehicle operating under the surface of the water.

Other objects and advantages of the present invention will become more obvious hereinafter in the specification and drawings.

In accordance with the present invention, a system generates an approximate GPS position of a vehicle traveling under the surface of the water. A tether is coupled on one end thereof to the vehicle and a plurality of floatable structures are coupled to the tether at spaced-apart positions therealong. A position determination system is typically positioned at either the one floatable structure that is furthest away from the vehicle or onboard the vehicle. A plurality of GPS antennas are provided with at least one GPS antenna being coupled to each remaining one of the floatable structures that reside between the vehicle and the one floatable structure that is furthest away from the vehicle. Each GPS antenna is capable of receiving GPS signals when at the surface of the water. Each GPS antenna is also coupled to the position determination system. The position determination system uses the GPS signals received at the GPS antenna that is nearest the vehicle to generate a global position fix that approximates a GPS position of the vehicle.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
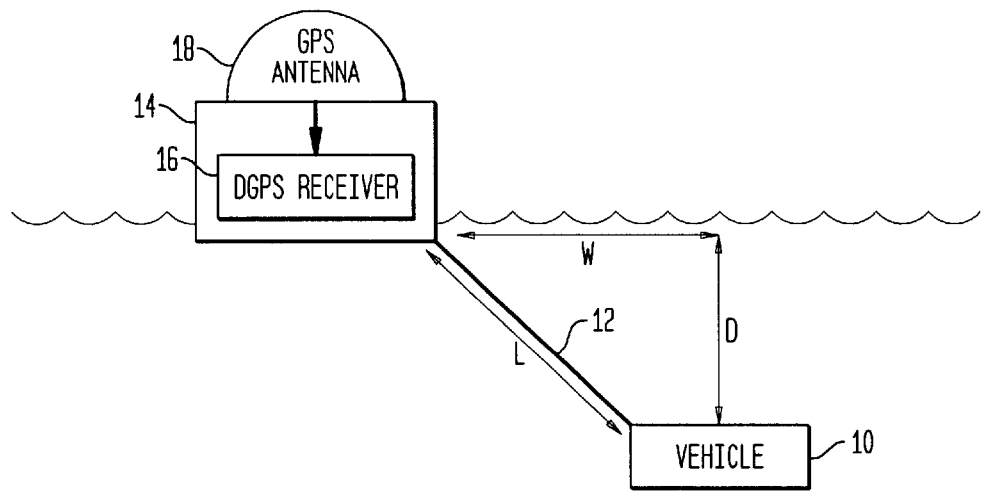
FIG. 1 is a schematic view of a prior art approach to obtaining a GPS position fix for a vehicle operating under the surface of the water.
Figure 2:
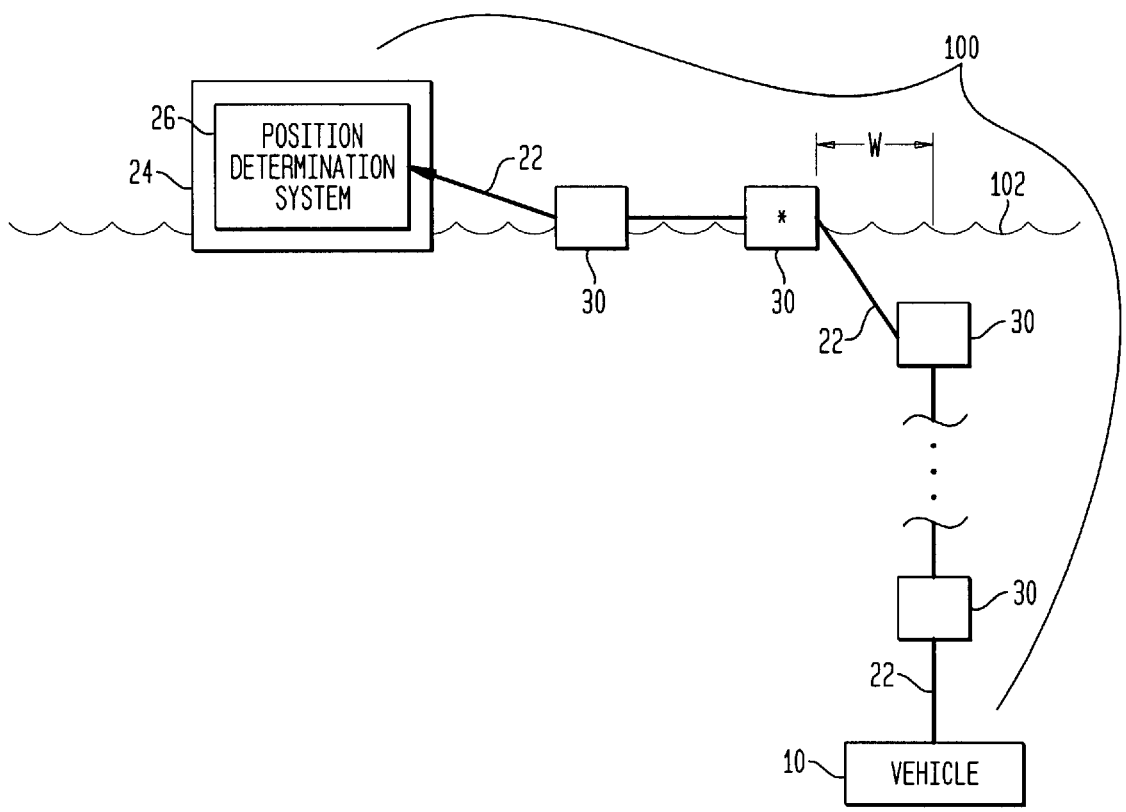
FIG. 2 is a schematic view of a system for generating a GPS position fix of a vehicle operating under the surface of the water in accordance with the present invention.

Referring now to the drawings, and more particularly to FIG. 2, a system in accordance with the present invention for approximating a GPS position of a vehicle operating under the surface 102 of the water is shown and referenced generally by numeral 100. Vehicle 10 can be a manned or unmanned vehicle traveling in the water above or on the sea floor. Accordingly, it is to be understood that vehicle 10 does not limit system 100 in any way.

System 100 has a fixed-length tether 22 coupled on one end thereof to vehicle 10. Tether 22 is coupled on its other end to float 24 on which a position determination system 26 is located. Note that position determination system 26 could also be located onboard vehicle 10 as will be explained further below. Coupled to tether 22 at spaced-apart positions therealong are floatable GPS signal-receiving stations 30. In general, each of stations 30 is equipped to receive a GPS type of signal when floating at surface 102. The GPS type of signal can originate directly from the earth-orbiting GPS satellites or indirectly from, for example, the ground reference stations of the North American Wide Angle Augmentation System (WAAS), Asia's Functional Satellite Augmentation System (MSAS) or Europe's Euro Geostationary Overlay Service (EGNOS).

Briefly, WAAS consists of approximately twenty-five ground reference stations positioned across the United States to monitor GPS satellite data. Two coastal-located master stations collect data from the reference stations and create a GPS correction message. The correction accounts for GPS satellite orbit and clock drift plus signal delays caused by the atmosphere and ionosphere. The corrected differential message (or "WAAS correction") is then broadcast through one of two geostationary satellites or satellites with a fixed position over the equator in a signal structure or form that is compatible with the basic GPS signal structure. A WAAS receiver generates position fixes utilizing the standard GPS signals in conjunction with the received WAAS corrections. Since WAAS's signal reception is ideally suited for open land and marine applications, it can provide extended inland and offshore coverage compared to the land-based DGPS (differential GPS) system. Another benefit of WAAS is that it does not require additional receiving equipment while DGPS does. However, the ultimate accuracy of a WAAS-based system is not as good as a DGPS-based system which can use locally generated corrections.

Regardless of the type of position determination system 26, the GPS signals received at stations 30 (i.e., those floating at surface 102) must be relayed to position determination system 26. Accordingly, tether 22 will incorporate some type of signal-carrying conductor(s) (not shown in FIG. 2) running therethrough for transferring the GPS signals to system 30. Such conductors can be electrical or optical conductors without departing from the scope of the present invention. Tether 22 can also include strength members (not shown) as would be understood by one of ordinary skill in the art.

The basic operating principles of system 100 can be explained as follows. As vehicle 10 travels through the water, the operating depth of vehicle 10 determines how many of stations 30 will float at surface 102 and how many will lie beneath surface 102. Since GPS signals do not penetrate into the water, only those of stations 30 floating at surface 102 (e.g., two in the illustrated example) will receive GPS signals. Using this fact, position determination system 26 processes the GPS signals from one of stations 30 that is closest to vehicle 10, i.e., station 30 marked with an asterisk in FIG. 2. By doing so, position determination system 26 essentially determines the global position of station 30 marked with the asterisk. Thus, the resulting watch circle error W is greatly reduced as it is only predicated on the length of tether 22 between adjacent stations 30 as opposed to the overall length of tether 22 as is the case for the prior art approach.

Figure 3:
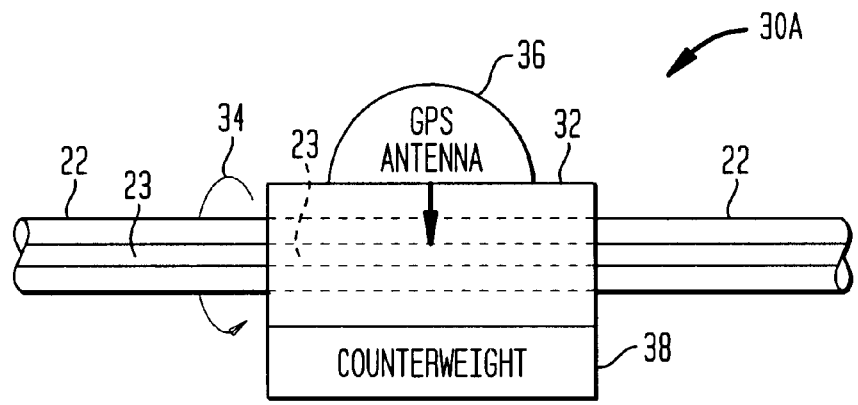
FIG. 3 is a schematic side view of a floating GPS signal-receiving station in accordance with one embodiment of the present invention.
Figure 4:
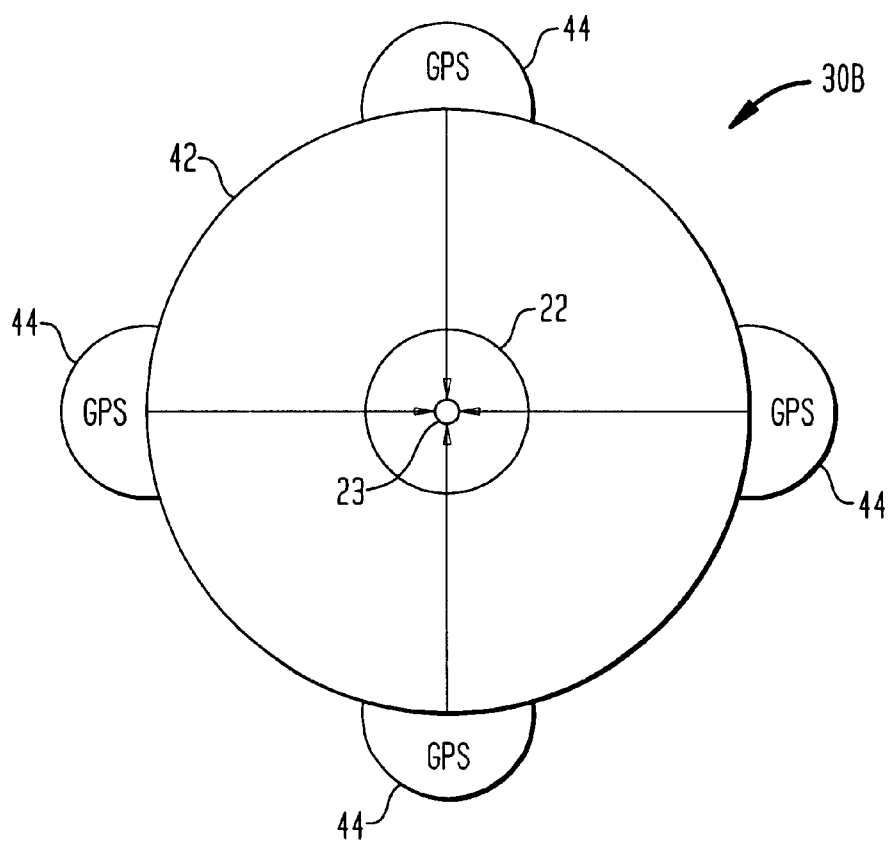
FIG. 4 is a schematic end view of a floating GPS signal-receiving station in accordance with another embodiment of the present invention.

A variety of configurations for position determination system 26 and floatable GPS signal-receiving stations 30 can be utilized without departing from the scope of the present invention. By way of non-limiting examples, two embodiments of the stations are illustrated in FIGS. 3 and 4, and are referenced generally by numerals 30A and 30B, respectively. In FIG. 3, station 30A utilizes a buoyant sleeve 32 disposed about and coupled to tether 22 such that it can freely spin about tether 22 as indicated by arrow 34. The particular construction or material used for buoyant sleeve 32 is not a limitation of the present invention. Coupled to buoyant sleeve 32 is a GPS antenna 36 capable of receiving GPS types of signals when in the air. It is to be understood that the term "GPS antenna" antenna as used herein is representative of either just the antenna itself or the antenna and associated receiver electronics.

To ensure that GPS antenna 36 faces up into the air when station 30A floats at the water's surface, a counterweight 38 can be coupled to buoyant sleeve 32 so that GPS antenna 36 will achieve its proper in-air orientation. The GPS types of signals received by GPS antenna 36 are transferred to a signal-carrying conductor 23 running through tether 22. Signal transfer can occur by any one of a variety of contact or other signal transfer mechanisms.

In FIG. 4, station 30B also utilizes a buoyant sleeve 42. However, sleeve 42 is fixedly coupled to tether 22 as opposed to freely spinning thereabout. A plurality of GPS antennas 44 (e.g., four are shown) are coupled to buoyant sleeve 42 such that at least one of GPS antennas 44 will be oriented upward into the air when station 30B floats at the water's surface. Each of GPS antennas 44 is coupled to conductor 23 for the transfer of GPS signals therefrom.

Figure 5:
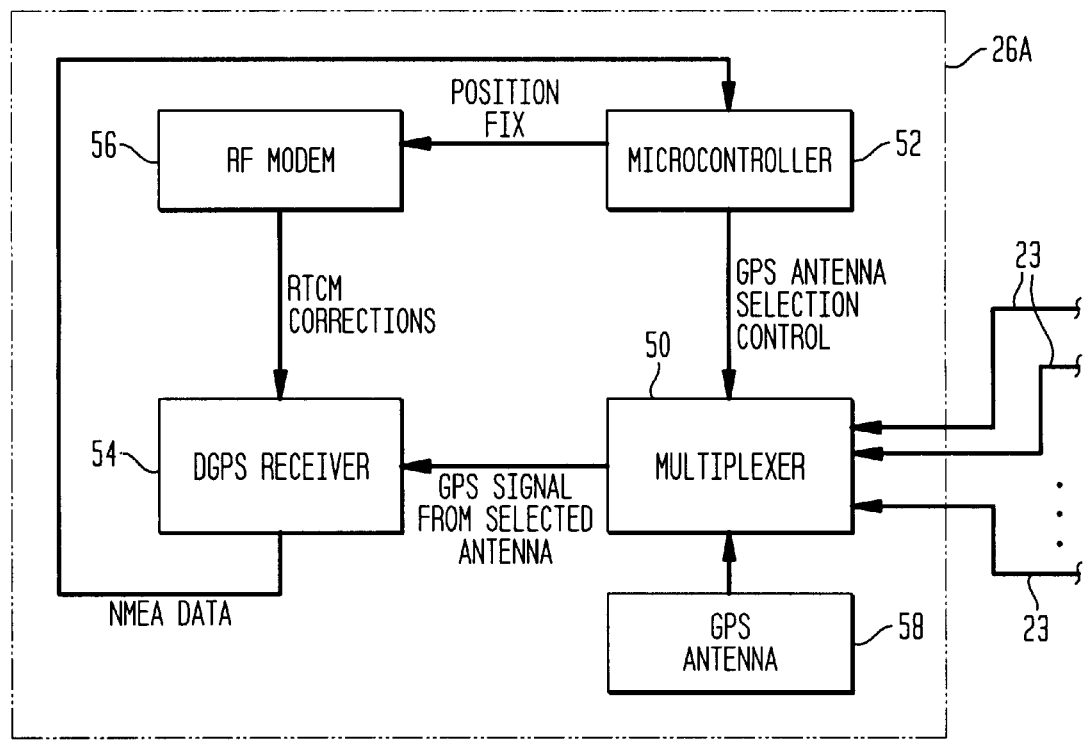
FIG. 5 is a schematic view of a DGPS-based position determination system for use in the present invention.
Figure 6:
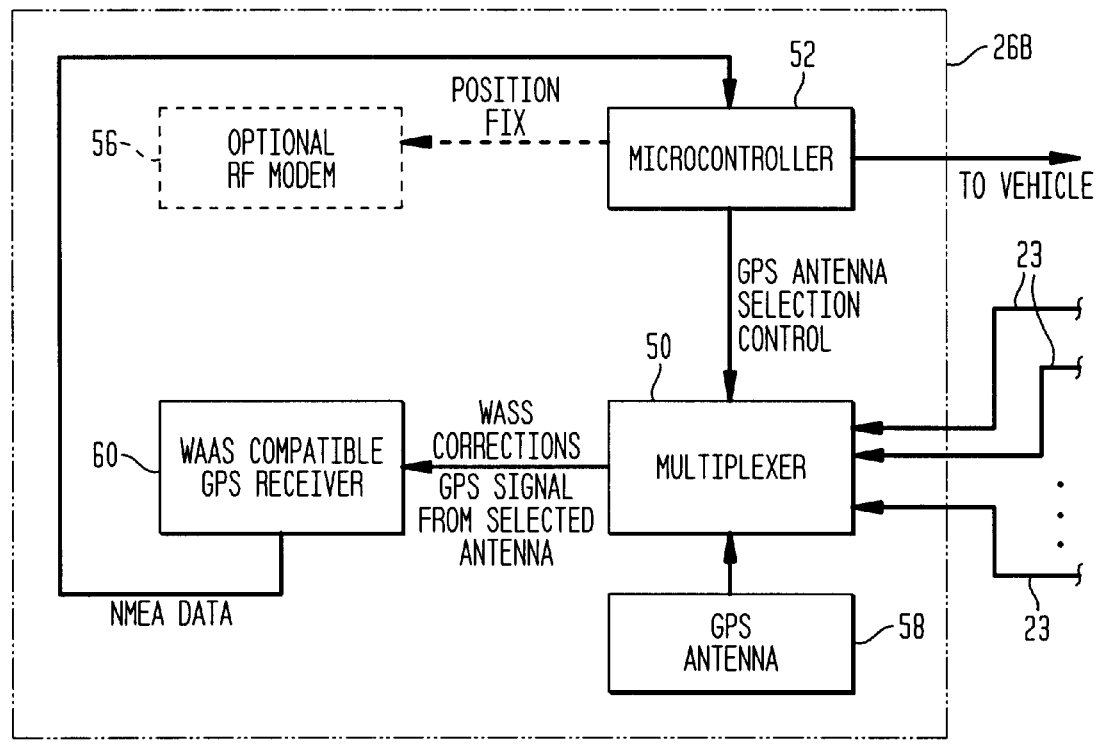
FIG. 6 is a schematic view of a Wide Area Augmentation System (WAAS)-based position determination system for use in the present invention.

As mentioned above, a variety of configurations also exist for position determination system 26. By way of non-limiting examples, two embodiments of the position determination system are illustrated in FIGS. 5 and 6, and are referenced generally by numerals 26A and 26B, respectively. In FIG. 5, a conductor 23 from each of stations 30 is coupled to a multiplexer 50. (Note that a single conductor 23 could also be used with the data being passed thereon multiplexed and identified with a particular station of origin.) Multiplexer 50 is controlled by a microcontroller 52 to select the one station receiving GPS signals that is closest to vehicle 10. The selected GPS signals are passed to a DGPS receiver 54 capable of generating differentially corrected position fixes using the GPS satellites and the Radio Technical Commission for Maritime Services (RTCM) SC104-STD differential corrections received from an RF modem 56. The apparatus and methods for achieving this are well understood in the art. The position fixes and various status/health information are then sent to microcontroller 52 using the format defined by the National Marine Electronics Association (NMEA) 0183 standard.

Microcontroller 52 monitors the NMEA data received from DGPS receiver 54 to determine if the "best" GPS antenna on tether 22 has been selected. The "best" antenna is the one closest to vehicle 10 that is not submerged. Microcontroller 52 uses satellite status/health information obtained from DGPS receiver 54 while it is connected to each antenna to ascertain which antenna closest to vehicle 10 is providing reliable satellite information. Microcontroller 52 could also calculate the approximate depth of vehicle 10 based on the "best" antenna's distance to the vehicle.

RF modem 56 receives Radio Technical Commission for Maritime Services (RTCM) differential corrections from a nearby base station. These corrections are used to remove errors associated with the GPS system, such as errors caused by environmental factors. Modem 56 can optionally be used to send position data generated by the present invention to a remote site for tracking purposes. System 26A could optionally include another GPS antenna 58 located therewith and coupled to multiplexer 50. GPS antenna 58 could serve as a back-up should all of stations 30 be submerged. Further, GPS antenna 58 could be used to indicate if the entire system of the present invention is submerged as would be the case of no GPS signals were detected by any of stations 30 or GPS antenna 58.

In FIG. 6, position determination system 26B is a WAAS-based system that operates in a manner similar to system 26. The primary differences between systems 26A and 26B are that a WAAS compatible GPS receiver 60 is used instead of DGPS receiver 54 and that RF modem 56 is not required because corrections are now received using GPS antenna 58. However, although RF modem 56 is no longer needed to receive RTCM corrections, it could still be included to transmit position fixes back to a remote site. If RF modem 56 is eliminated, the position fix (NMEA) information could be sent from microcontroller 52 via the tether to the vehicle where the position fix information can be used by the vehicle as a navigation aid.

Another option for the WAAS version is to install multiplexer 50, microcontroller 52 and WAAS receiver 60 onboard the vehicle. Float 24 could then be realized by a positively buoyant tail having just GPS antenna 58 installed thereon.

Programming of microcontroller 52 for either of systems 26A or 26B could be accomplished in a variety of fashions. For example, microcontroller 52 could implement a methodical search algorithm for the "best" GPS antenna. The search could begin looking for valid GPS data at the station closest to the towing vehicle. If no valid GPS data existed there, microcontroller 52 could incrementally check stations further from the towing vehicle until valid GPS data was found. Then, each update cycle would start at the most recently found "best" GPS antenna. The detection of valid GPS data could then trigger a search that worked back toward the towing vehicle to see if data were now available from a GPS antenna located closer to the towing vehicle. However, if no valid GPS data were available from the most recently found "best" GPS antenna, the search would again incrementally check GPS antennas further away from the towing vehicle.

The advantages of the present invention are numerous. The present invention is capable of automatically providing GPS-based position fixes and/or tracking data while minimizing the typically large errors associated with the watch circle effect found with the current use of GPS/DGPS on a surface float towed behind the vehicle. Furthermore, the system is capable of automatically providing approximate depth information and can provide warning when the entire tether length is submerged which could result in the float being submerged. No major setup is required and the system will operate without additional user intervention after the setup is complete.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A system for generating an approximate GPS position of a vehicle traveling under the surface of the water, comprising:
    a tether coupled on one end thereof to the vehicle traveling under the surface of the water;
    a plurality of floatable structures coupled to said tether at spaced-apart positions therealong;
    a position determination system positioned at one of said plurality of floatable structures that is furthest away from the vehicle;
    a plurality of GPS antennas wherein at least one GPS antenna is coupled to each of remaining ones of said plurality of floatable structures that reside between the vehicle and said one of said plurality of floatable structures that is furthest away from the vehicle, each of said plurality of GPS antennas receiving GPS signals when at the surface of the water and further being coupled to said position determination system; and
    said position determination system using said GPS signals received at one of said plurality of GPS antennas that is nearest the vehicle, wherein said position determination system generates a global position fix using said GPS signals to approximate a GPS position of the vehicle.

2. A system as in claim 1 wherein said position determination system is a DGPS-based system.

3. A system as in claim 1 wherein said position determination system is a WAAS-based system.

4. A system as in claim 1 wherein each of said plurality of floatable structures includes means coupled thereto for orienting same in a preferred orientation when floating at the surface of the water.

5. A system as in claim 1 wherein one of said plurality of GPS antennas is coupled to said one of said plurality of floatable structures that is furthest away from the vehicle.

6. A system for generating an approximate GPS position of a vehicle traveling under the surface of the water, comprising:
    a tether coupled on one end thereof to the vehicle traveling under the surface of the water, said tether incorporating signal-carrying means therein;
    a plurality of floatable structures coupled to said tether at spaced-apart positions therealong;
    a position determination system located on one of said plurality of floatable structures that is furthest away from the vehicle;
    a plurality of GPS antennas wherein at least one GPS antenna is coupled to each of remaining ones of said plurality of floatable structures that reside between the vehicle and said one of said plurality of floatable structures that is furthest away from the vehicle, each of said plurality of GPS antennas receiving GPS signals when at the surface of the water and further being coupled to said signal-carrying means; and
    means coupled to said signal-carrying means and said position determination system for providing said GPS signals received at one of said plurality of GPS antennas that is nearest the vehicle to said position determination system, wherein said position determination system generates a global position fix using said GPS signals so-provided to approximate a GPS position of the vehicle.

7. A system as in claim 6 wherein said position determination system is a DGPS-based system.

8. A system as in claim 6 wherein said position determination system is a WAAS-based system.

9. A system as in claim 6 wherein each of said plurality of floatable structures includes means coupled thereto for orienting same in a preferred orientation when floating at the surface of the water.

10. A system as in claim 6 wherein one of said plurality of GPS antennas is located on said one of said plurality of floatable structures that is furthest away from the vehicle and is coupled to said means for providing said GPS signals.

11. A system for generating an approximate GPS position of a vehicle traveling under the surface of the water, comprising:
a tether having a first end and a second end, said first end being coupled to the vehicle traveling under the surface of the water, said tether incorporating signal-carrying means therein;
a plurality of buoyant sleeves coupled to said tether for free rotation thereabout at spaced-apart positions therealong between said first end and said second end;
a floatable structure coupled to said second end of said tether;
a position determination system located on said floatable structure;
a plurality of GPS antennas wherein at least one GPS antenna is coupled to each of said plurality of buoyant sleeves, each of said plurality of GPS antennas receiving GPS signals when at the surface of the water and further being coupled to said signal-carrying means; and
means coupled to said signal-carrying means and said position determination system for providing said GPS signals received at one of said plurality of GPS antennas that is nearest the vehicle to said position determination system, wherein said position determination system generates a global position fix using said GPS signals so-provided to approximate a GPS position of the vehicle.

12. A system as in claim 11 wherein said position determination system is a DGPS-based system.

13. A system as in claim 11 wherein said position determination system is a WAAS-based system.

14. A system as in claim 11 wherein each of said plurality of buoyant sleeves has a weight coupled thereto for orienting same in a preferred orientation when floating at the surface of the water.

15. A system as in claim 11 wherein one of said plurality of GPS antennas is located on said floatable structure and is coupled to said means for providing said GPS signals.

16. A system for generating an approximate GPS position of a vehicle traveling under the surface of the water, comprising:
a tether coupled on one end thereof to the vehicle traveling under the surface of the water;
a plurality of floatable structures coupled to said tether at spaced-apart positions therealong;
a position determination system positioned at one of the vehicle and said plurality of floatable structures;
a plurality of GPS antennas wherein at least one GPS antenna is coupled to each of said plurality of floatable structures, each of said plurality of GPS antennas receiving GPS signals when at the surface of the water and further being coupled to said position determination system; and
said position determination system using said GPS signals received at one of said plurality of GPS antennas that is nearest the vehicle, wherein said position determination system generates a global position fix using said GPS signals to approximate a GPS position of the vehicle.

17. A system as in claim 16 wherein said position determination system is a DGPS-based system.

18. A system as in claim 16 wherein said position determination system is a WAAS-based system.

19. A system as in claim 16 wherein each of said plurality of floatable structures includes means coupled thereto for orienting same in a preferred orientation when floating at the surface of the water.

* * * * *